US012159382B2

(12) United States Patent
Fujita

(10) Patent No.: US 12,159,382 B2
(45) Date of Patent: Dec. 3, 2024

(54) INFORMATION PROCESSING APPARATUS USING CHAT SYSTEM TO EDIT IMAGE, INFORMATION PROCESSING METHOD OF THE SAME, AND COMPUTER-READABLE NON-TRANSITORY RECORDING MEDIUM HAVING STORED THEREON PROGRAM OF INFORMATION PROCESSING METHOD

(71) Applicant: KYOCERA Document Solutions Inc., Osaka (JP)

(72) Inventor: Takuma Fujita, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 338 days.

(21) Appl. No.: 17/695,967

(22) Filed: Mar. 16, 2022

(65) Prior Publication Data

US 2022/0309628 A1   Sep. 29, 2022

(30) Foreign Application Priority Data

Mar. 26, 2021   (JP) ................................ 2021-052813

(51) Int. Cl.
| | |
|---|---|
| *G06F 40/253* | (2020.01) |
| *G06F 40/268* | (2020.01) |
| *G06T 5/90* | (2024.01) |
| *H04L 51/02* | (2022.01) |
| *H04L 51/10* | (2022.01) |

(52) U.S. Cl.
CPC .............. *G06T 5/90* (2024.01); *G06F 40/253* (2020.01); *G06F 40/268* (2020.01); *H04L 51/02* (2013.01); *H04L 51/10* (2013.01)

(58) Field of Classification Search
CPC ......... G06T 5/90; G06T 11/60; G06T 11/001; G06F 40/253; G06F 40/268; G06F 16/3329; G06F 40/205; H04L 51/02; H04L 51/10
See application file for complete search history.

(56) References Cited

U.S. PATENT DOCUMENTS

| | | | |
|---|---|---|---|
| 11,720,300 B2* | 8/2023 | Yamamoto | ............ G06F 3/1222 |
| | | | 358/1.15 |
| 2018/0227251 A1* | 8/2018 | Takishima | .............. H04L 51/02 |

(Continued)

FOREIGN PATENT DOCUMENTS

| | | |
|---|---|---|
| JP | 2019-207513 | 12/2019 |
| JP | 2020-052507 | 4/2020 |

*Primary Examiner* — Juan M Guillermety
(74) *Attorney, Agent, or Firm* — LEX IP MEISTER, PLLC

(57) ABSTRACT

An information processing apparatus includes: a chatbot module which receives an image sent from a terminal apparatus to a chat system, and a message indicating that the image is to be edited; a message determination module which extracts a key value from the message; a database which registers a plurality of different key values, and a plurality of different parameter sets corresponding to each of the key values; and an image editing module which reads, from the database, a plurality of different parameter sets corresponding to the key value extracted from the message, and edits the image in accordance with each of the plurality of different parameter sets, thereby generating a plurality of different edited images. The chatbot module sends the plurality of different edited images to the chat system, and determines the edited image selected on the chat system by the terminal apparatus.

8 Claims, 4 Drawing Sheets

(56) References Cited

U.S. PATENT DOCUMENTS

| | | | | |
|---|---|---|---|---|
| 2019/0079955 A1* | 3/2019 | Kato | .................. | G06T 11/60 |
| 2019/0369924 A1* | 12/2019 | Oka | .................. | H04L 51/02 |
| 2020/0099637 A1* | 3/2020 | Kurokawa | ............ | G06F 3/1222 |
| 2020/0133592 A1* | 4/2020 | Mitsuhashi | ............ | G06F 3/1204 |
| 2020/0304439 A1* | 9/2020 | Matsumoto | ............ | H04L 51/02 |
| 2021/0004437 A1* | 1/2021 | Zhang | .................. | G06N 5/04 |
| 2021/0120144 A1* | 4/2021 | Takahashi | .......... | H04N 1/32128 |

* cited by examiner

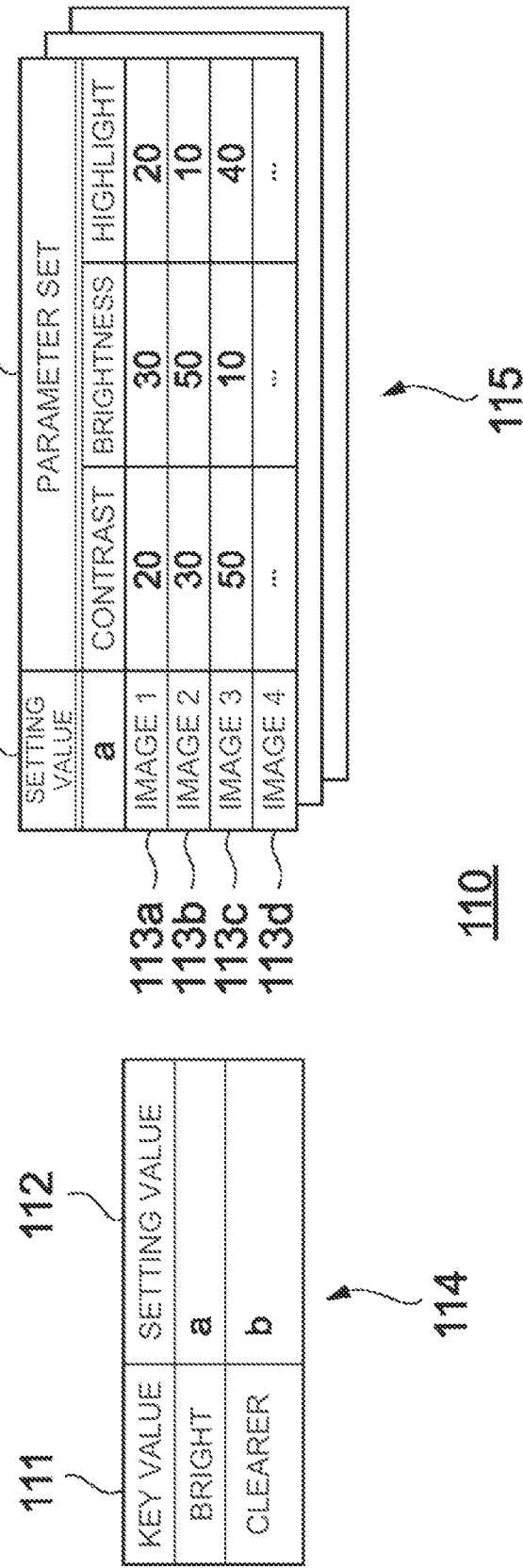

INFORMATION PROCESSING APPARATUS USING CHAT SYSTEM TO EDIT IMAGE, INFORMATION PROCESSING METHOD OF THE SAME, AND COMPUTER-READABLE NON-TRANSITORY RECORDING MEDIUM HAVING STORED THEREON PROGRAM OF INFORMATION PROCESSING METHOD

INCORPORATION BY REFERENCE

This application is based upon, and claims the benefit of priority from, corresponding Japanese Patent Application No. 2021-052813 filed in the Japan Patent Office on Mar. 26, 2021, the entire contents of which are incorporated herein by reference.

BACKGROUND

Field of the Invention

The present disclosure relates to an information processing apparatus which edits an image received from a terminal apparatus and outputs the edited image, an information processing method, and a computer-readable non-transitory recording medium having stored thereon an information processing program.

Description of Related Art

In editing images, the user inputs the value of a parameter for each edit item such as the highlight and contrast, so that the image has the brightness or the like as desired by the user, and the intended image is thus obtained.

SUMMARY

An information processing apparatus according to one embodiment of the present disclosure includes: a chatbot module which receives an image sent from a terminal apparatus to a chat system, and a message indicating that the image is to be edited; a message determination module which extracts a key value from the message; a database which registers a plurality of different key values, and a plurality of different parameter sets corresponding to each of the key values; and an image editing module which reads, from the database, a plurality of different parameter sets corresponding to the key value extracted from the message, and edits the image in accordance with each of the plurality of different parameter sets, thereby generating a plurality of different edited images. The chatbot module: sends the plurality of different edited images to the chat system; determines the edited image selected on the chat system by the terminal apparatus; and outputs the edited image that has been selected, when the chatbot module receives a post indicating that the edited image is to be output, the post being sent from the terminal apparatus to the chat system.

An information processing method according to one embodiment of the present disclosure includes: receiving an image sent from a terminal apparatus to a chat system, and a message indicating that the image is to be edited; extracting a key value from the message; reading, from a database which registers a plurality of different key values, and a plurality of different parameter sets corresponding to each of the key values, a plurality of different parameter sets corresponding to the key value extracted from the message; editing the image in accordance with each of the plurality of different parameter sets, thereby generating a plurality of different edited images; sending the plurality of different edited images to the chat system; determining the edited image selected on the chat system by the terminal apparatus; and outputting the edited image that has been selected, when a post, which indicates that the edited image is to be output and which is sent from the terminal apparatus to the chat system, is received.

In a computer-readable non-transitory recording medium having stored thereon an information processing program according to one embodiment of the present disclosure, the information processing program causes a processor of an information processing apparatus to operate as: a chatbot module which receives an image sent from a terminal apparatus to a chat system, and a message indicating that the image is to be edited; a message determination module which extracts a key value from the message; a database which registers a plurality of different key values, and a plurality of different parameter sets corresponding to each of the key values; and an image editing module which reads, from the database, a plurality of different parameter sets corresponding to the key value extracted from the message, and edits the image in accordance with each of the plurality of different parameter sets, thereby generating a plurality of different edited images. The chatbot module sends the plurality of different edited images to the chat system; determines the edited image selected on the chat system by the terminal apparatus; and outputs the edited image that has been selected, when the chatbot module receives a post indicating that the edited image is to be output, the post being sent from the terminal apparatus to the chat system.

BRIEF DESCRIPTION OF THE DRAWINGS

FIG. 4 shows an example of a database.

DETAILED DESCRIPTION

Embodiments of the present disclosure will be described below with reference to the accompanying drawings.

1. CONFIGURATION OF INFORMATION PROCESSING APPARATUS

Figure 1:
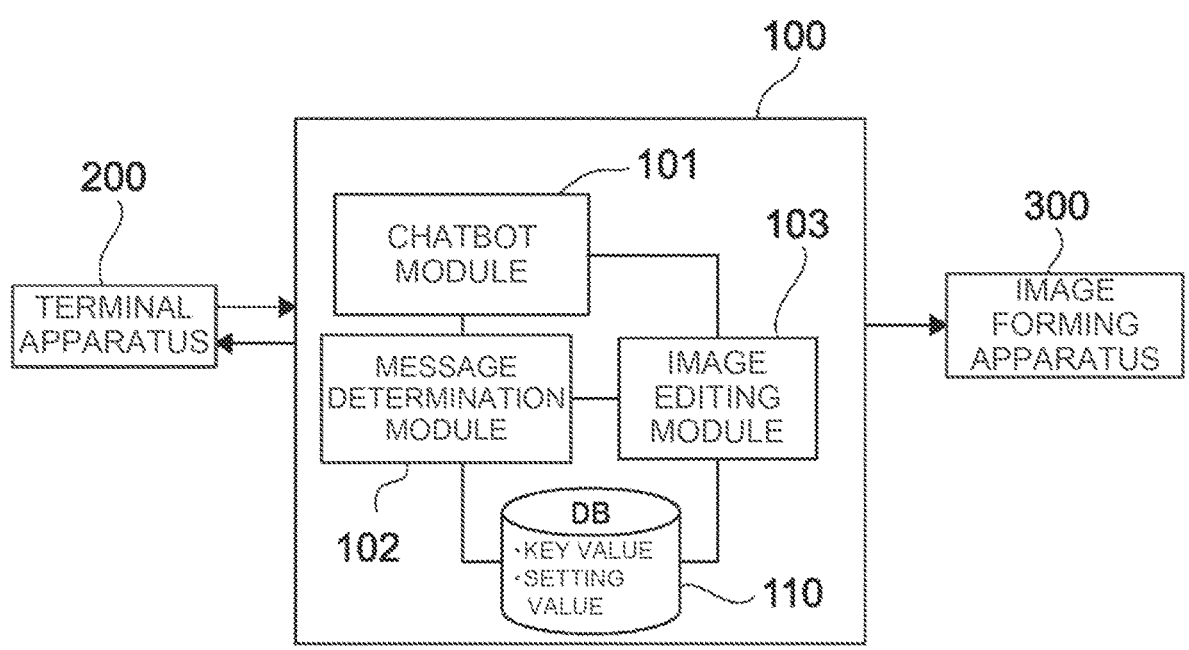
FIG. 1 illustrates a configuration of an information processing apparatus according to an embodiment of the present disclosure.

FIG. 1 illustrates a configuration of an information processing apparatus according to an embodiment of the present disclosure.

An information processing apparatus 100 can communicate with a terminal apparatus 200 and an image forming apparatus 300 via a network such as the Internet. The terminal apparatus 200 is a smartphone, a tablet computer, or a personal computer, etc., used by a user. The image forming apparatus 300 is, for example, a multifunction peripheral (MFP). The information processing apparatus 100 is a print control apparatus capable of receiving an image from the terminal apparatus 200 and editing the image, and outputting the edited image to the image forming apparatus 300.

In a control circuit of the information processing apparatus 100, as a processor such as a CPU loads an information processing program, which is stored in a ROM, into a RAM and executes the information processing program, the information processing apparatus 100 operates as a chatbot module 101, a message determination module 102, and an image editing module 103. The information processing apparatus 100 has a database 110 to be stored by a large-capacity non-volatile storage medium such as an HDD or an SSD.

2. OPERATION FLOW OF INFORMATION PROCESSING APPARATUS

Figure 2:
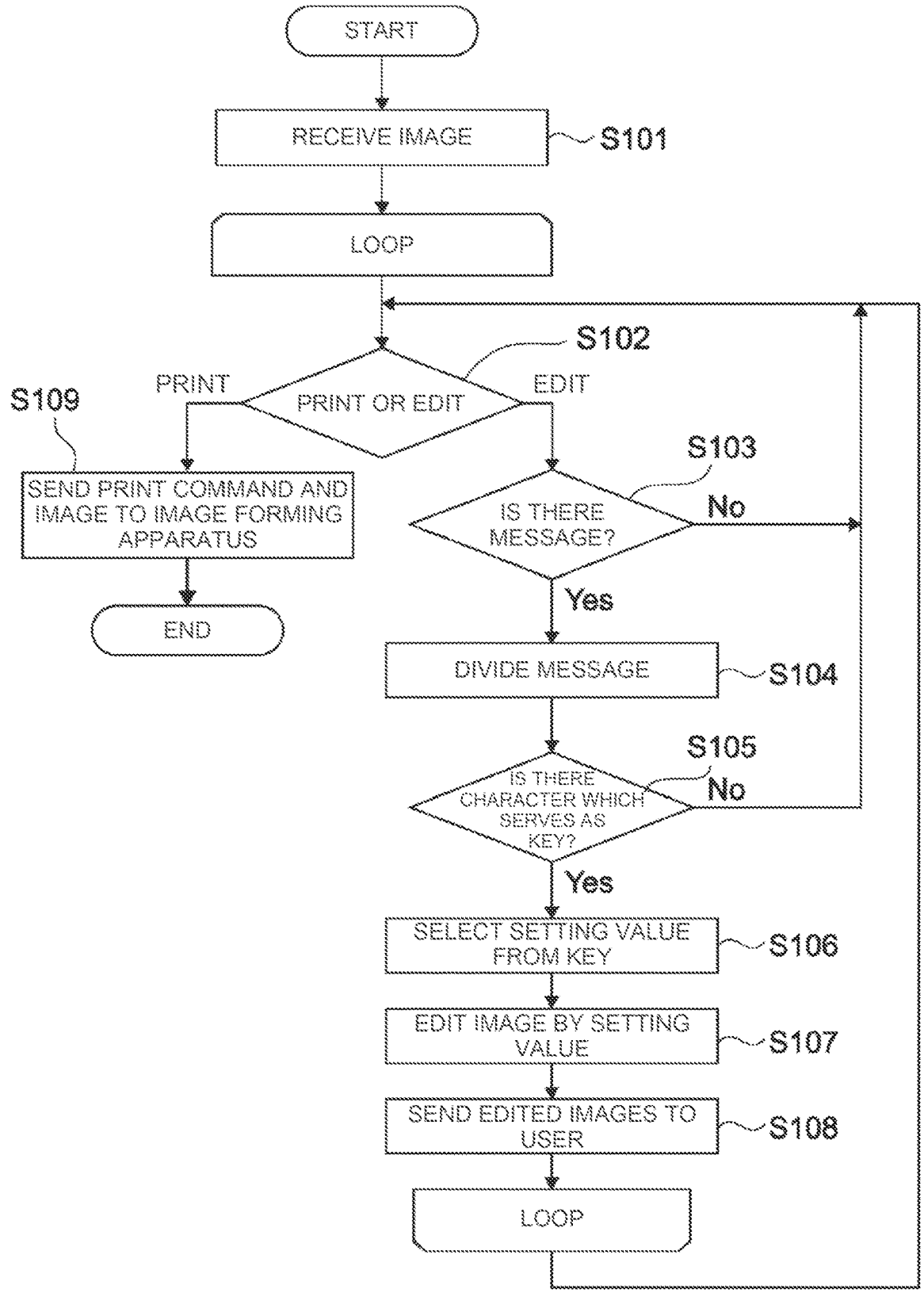
FIG. 2 shows an operation flow of the information processing apparatus.
Figure 3:
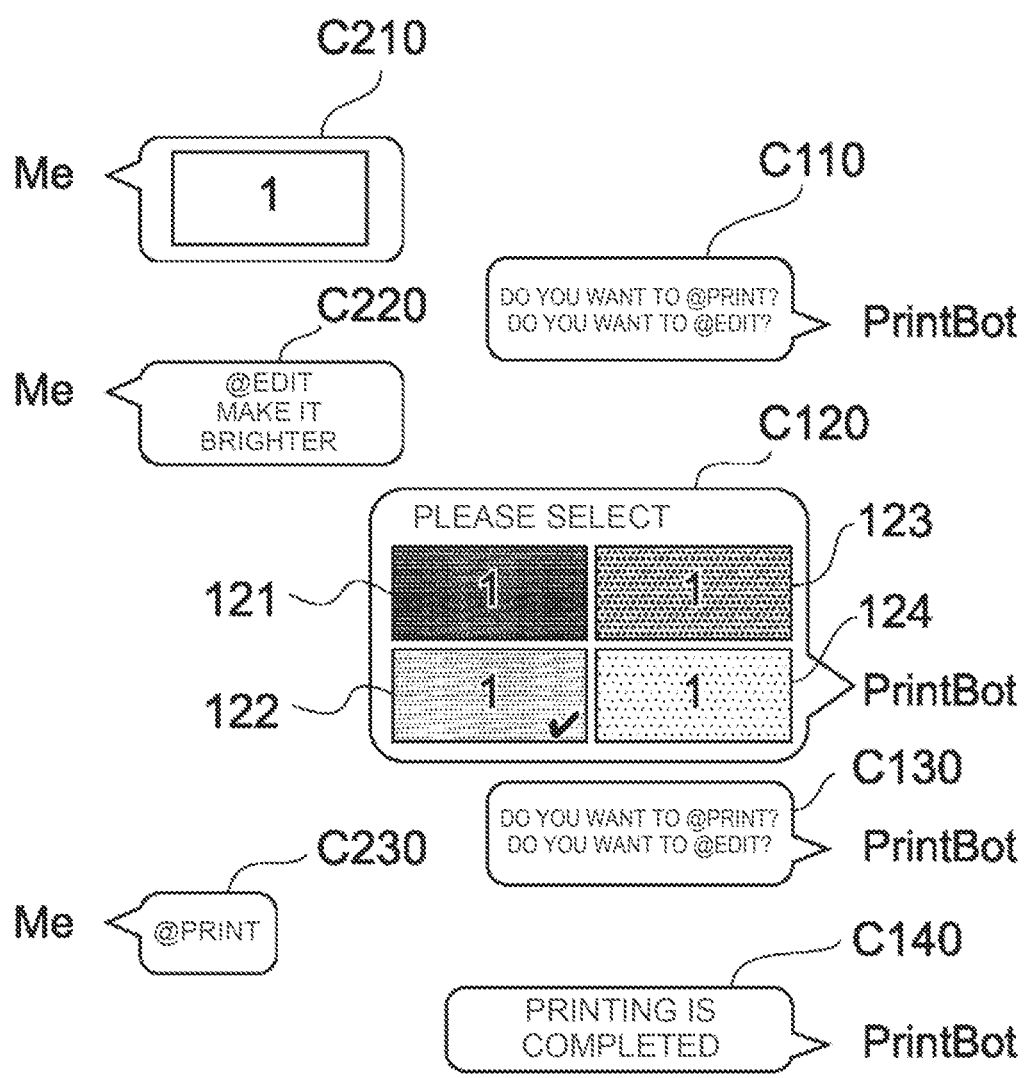
FIG. 3 shows an example of a chat screen displayed on a terminal apparatus.

FIG. 2 shows an operation flow of the information processing apparatus. FIG. 3 shows an example of a chat screen displayed on a terminal apparatus.

The terminal apparatus 200 sends an image C210 that the user wishes to edit and print to a chat system. The image C210 is displayed on a chat screen of the terminal apparatus 200. The chat system may be provided by the information processing apparatus 100, or by an external chat application supplier.

The chatbot module 101 of the information processing apparatus 100 receives the image C210 sent from the terminal apparatus 200 to the chat system (step S101). Then, the chatbot module 101 sends a post C110 asking whether the image C210 is to be printed or edited to the chat system. For example, the chatbot module 101 sends the post C110 including "@print" and "@edit" to the chat system.

The post C110 is displayed on the chat screen of the terminal apparatus 200. The user performs an operation on "@print" or "@edit" included in the post C110 displayed on the chat screen of the terminal apparatus 200. In the present example, the user selects "@edit" included in the post C110, and further inputs a message, i.e., "make it brighter", which is a linguistic expression representing the image as intended. The terminal apparatus 200 sends a post C220 including "@edit" and "make it brighter" to the chat system.

The chatbot module 101 of the information processing apparatus 100 receives the post C220 sent from the terminal apparatus 200 to the chat system. The chatbot module 101 determines which one of "@print" and "@edit" included in the post C110, which the chatbot module 101 has sent, the post C220 includes (step S102). The chatbot module 101 determines that the post C220 includes "@edit". Next, the chatbot module 101 determines whether or not the post C220 includes a message indicating that the image C210 is to be edited (step S103). In the present example, since the post C220 includes the message "make it brighter", it is determined that the post C220 includes a message indicating that the image C210 is to be edited (step S103; YES).

The message determination module 102 of the information processing apparatus 100 extracts a key value from the message included in the post C220. Specifically, the message determination module 102 performs morphological analysis on the message, and extracts an adjective or an adjectival noun obtained by the morphological analysis as the key value. In the present example, the message determination module 102 performs morphological analysis on the message "make it brighter (phonetically expressed as "akaruku-shi-te" in Japanese)", and divides the message into parts of an adjective" akaruku" (the Japanese word corresponding to "bright"), a verb "shi" (the Japanese word corresponding to "do"), and a postpositional particle "te" (the Japanese word giving the meaning of a request) (step S104). The message determination module 102 extracts the adjective "akaruku (bright)" obtained by the morphological analysis as the key value (step S105; YES).

When the message determination module 102 detects a plurality of adjectives and/or adjectival nouns, the message determination module 102 extracts a phrase including all of the plurality of adjectives and/or adjectival nouns as the key value. For example, it is assumed that the message is "make it bright and become clearer" (not shown). In this example, the message determination module 102 performs morphological analysis on the message "make it bright and become clearer" (phonetically expressed as "akaruku-azayaka-ni" in Japanese)", and divides the message into parts of an adjective "akaruku" (the Japanese word corresponding to "bright"), an adjectival noun "azayaka" (the Japanese word corresponding to "clear"), and an auxiliary verb "ni" (the Japanese word giving the meaning of "to become") (step S104). The message determination module 102 extracts a phrase which is "akaruku-azayaka (bright and clear)" including all of the adjective "akaruku (bright)" and the adjectival noun "azayaka (clear)" obtained by the morphological analysis as the key value (step S105; YES).

FIG. 4 shows an example of a database.

The database 110 includes a first table 114, and a plurality of second tables 115. The first table 114 registers a plurality of different key values 111, and setting values 112 corresponding to the respective key values 111. In the present example, the first table 114 registers a plurality of different key values 111, i.e., "bright" and "clearer", and setting values 112 "a" and "b" corresponding to the key values 111 of "bright" and "clearer", respectively.

The plurality of second tables 115 correspond to the setting values 112 "a" and "b", respectively. In other words, a single second table 115 is provided for each setting value 112. In the second table 115 pertaining to a single setting value 112, a plurality of different parameter sets 113 are registered. For example, in the second table 115 pertaining to the setting value 112 "a" corresponding to the key value 111 which is "bright", a plurality of different parameter sets 113a, 113b, 113c, and 113d are registered.

The parameter set 113 is a combination of parameters for a plurality of edit items. For example, a single parameter set 113a is a combination of the parameter "20" for an edit item "Contrast", the parameter "30" for an edit item "Brightness", and the parameter "20" for an edit item "Highlight". The plurality of different parameter sets 113a, 113b, 113c, and 113d registered for a single setting value 112 are all different from one another.

In other words, even if the combination (contrast, brightness and highlight) of the edit items of the parameter sets is the same in a single second table 115, the combinations of the parameters (numerical values) of these three edit items are all different from one another. Alternatively, in a single second table 115, the combinations of the edit items of the parameter sets may be originally different. For example, in a single second table 115, the combination (for example, contrast and highlight) of the edit items of a certain parameter set may be different from the combination (for example, brightness and highlight) of the edit items of another parameter set.

A plurality of different parameter sets corresponding to a first key value, a plurality of different parameter sets corresponding to a second key value different from the first key value, and a plurality of different parameter sets corresponding to a third key value including the first key value and the second key value, which are all registered in the database 110, are different from one another. For example, a plurality of different parameter sets 113 corresponding to the first key value 111 which is "bright", a plurality of different parameter sets 113 corresponding to the second key value 111 which is "clear", and a plurality of different parameter sets 113 corresponding to the third key value 111 which is "bright and clear" are all different from one another. This enables registration of parameter sets having a higher level of closeness in terms of a linguistic expression representing the image as intended by the user in a subdivided way, and it becomes possible to create an edited image that is close to the image as intended by the user.

Due to the structure including the first table 114 and the plurality of second tables 115, the database 110 registers the plurality of different key values 111, and the plurality of different parameter sets 113 corresponding to each of the key values 111. For example, the database 110 registers the key value 111 which is "bright", and the plurality of different parameter sets 113a, 113b, 113c, and 113d corresponding to the key value 111 of "bright".

The image editing module 103 of the information processing apparatus 100 reads, from the database 110, a plurality of different parameter sets corresponding to the key value "bright", which the message determination module 102 extracted from the message "make it brighter" (step S106). In the present example, the image editing module 103 reads the setting value 112 "a" corresponding to the key value 111 which is "bright", from the first table 114 of the database 110. The image editing module 103 selects, from the database 110, a single second table 115 corresponding to the setting value 112 "a" that has been read. The image editing module 103 reads, from the selected second table 115, the plurality of different parameter sets 113a, 113b, 113c, and 113d.

The image editing module 103 of the information processing apparatus 100 edits the image C210 in accordance with each of the plurality of different parameter sets 113a, 113b, 113c, and 113d corresponding to the key value "bright". In this way, the image editing module 103 generates a plurality of different edited images 121, 122, 123, and 124 (step S107).

The chatbot module 101 of the information processing apparatus 100 sends a post C120, which includes the plurality of different edited images 121, 122, 123, and 124 generated by the image editing module 103, to the chat system (step S108). That is, the plurality of different edited images 121, 122, 123, and 124 are incorporated into a single post C120, and displayed in parallel.

On the chat screen of the terminal apparatus 200, the post C120 including the plurality of different edited images 121, 122, 123, and 124 is displayed. The user visually compares the edited images 121, 122, 123, and 124 and selects the one closest to the image as intended. In the present example, the user selects the edited image 122 on the chat system. A check mark is displayed on the selected edited image 122.

The chatbot module 101 of the information processing apparatus 100 determines the edited image 122 that has been selected on the chat system by the terminal apparatus 200. Then, the chatbot module 101 sends a post C130 asking whether the edited image 122 is to be printed or edited to the chat system. For example, the chatbot module 101 sends the post C130 including "@print" and "@edit" to the chat system. For example, the post C130 is the same as the post C110.

The post C130 is displayed on the chat screen of the terminal apparatus 200. The user performs an operation on "@print" or "@edit" included in the post C130 displayed on the chat screen of the terminal apparatus 200. In the present example, the user selects "@print" included in the post C130. The terminal apparatus 200 sends a post C230 including "@print" to the chat system.

The chatbot module 101 of the information processing apparatus 100 receives the post C230 sent from the terminal apparatus 200 to the chat system. The chatbot module 101 determines which one of "@print" and "@edit" included in the post C130, which the chatbot module 101 has sent, the post C230 includes (step S102). The chatbot module 101 determines that the post C230 includes "@print". In this way, the chatbot module 101 receives a post indicating that the edited image 122 is to be output (i.e., printed, in the present example), which has been sent from the terminal apparatus 200 to the chat system.

The information processing apparatus 100 sends a print command and the edited image 122 to the image forming apparatus 300 (step S109). The image forming apparatus 300 receives the print command and the edited image 122, and prints the edited image 122.

Note that when the chatbot module 101 of the information processing apparatus 100 receives a post C230 including "@edit" after posting the post C120 including the plurality of different edited images 121, 122, 123, and 124, the operation of step S103 and thereafter is repeated.

3. MODIFICATION EXAMPLE

Described below is a modification example of a case where the message includes a plurality of adjectives and/or adjectival nouns. In the embodiment described above, the message determination module 102 extracts, from the message "make it bright and become clearer", not two key values, which are "bright" and "clear", but one key value, which is "bright and clear". In the database 110, "bright", "clear" and "bright and clear" are registered as the key values 111. The image editing module 103 reads the parameter set 113 corresponding to "bright and clear" as the key value 111.

Instead of doing so, the message determination module 102 according to the modification example extracts, when a plurality of adjectives and/or adjectival nouns are detected, the plurality of adjectives and/or adjectival nouns as the key values, respectively. The image editing module 103 reads, from the database 110, at least a part of a plurality of different parameter sets corresponding to each of the extracted key values, and edits the image in accordance with each of the at least a part of the plurality of different parameter sets, thereby generating a plurality of different edited images.

In the case of the present example, the message determination module 102 extracts two key values, i.e., "bright" and "clear", from the message "make it bright and become clearer". The image editing module 103 reads two parameter sets, for example, corresponding to the key value 111 which is "bright", from the database 110, and reads two parameter sets, for example, corresponding to the key value 111 which is "clear", from the same. As the image editing module 103 edits the image in accordance with each of the four parameter sets that have been read, four different edited images are generated. Consequently, while creating edited images that are close to the image as intended by the user, a wide variety of edited images can be proposed to the user.

4. CONCLUSION

In a typical method, when an image is to be edited, the user needs to know in advance the effect of the parameter for each of the edit items in order to obtain the intended image. Only one pattern of the image edited in accordance with the parameter set by the user is displayed. If the user does not have the knowledge of the effect of the parameter for each of the edit items, or if the edited image being displayed is not the desired image, the user must change the parameter over and over again and repeat the editing. With this method, not only does it take time and effort to confirm the editing, but it is also not possible to visually compare the edited images simultaneously in parallel.

In contrast, according to the present embodiment, when the user wishes to print an image with an edit added thereon, he/she can perform the editing and printing by sending the image C210 and the message (post) C220 to the chat system. That is, when the user sends the message C220 on the chat system, the user does not need to consider and specify the setting items (contrast, etc.) to be changed, and the numerical values of the parameters. For the user, the desired edited image can be created by merely sending the message C220 including a linguistic expression (such as "make it brighter", "clearer", etc.) representing the image as intended. The information processing apparatus 100 analyzes the message, creates multiple patterns of edited images with respect to the image, and sends the created edited images to the user's terminal apparatus 200 via the chat system. Consequently, the user only needs to send the message C220 including a linguistic expression (such as "make it brighter", "clearer", etc.) representing the image as intended, and a plurality of edited images are thereby created. Therefore, it is possible to save the time and effort of sending messages a number of times, and repeating the editing each time for each pattern. In particular, the information processing apparatus 100 incorporates multiple patterns of edited images into a single post, and displays the edited images in parallel. Consequently, the user can easily compare the multiple patterns of edited images proposed on the chat system, and output (i.e., print, for example) the desired edited image.

While each embodiment and each modification example of the present technique have been described above, the present technique is not limited to the above-described embodiment alone, and various alterations can of course be added within the scope not departing from the gist of the present technique.

What is claimed is:

1. An information processing apparatus comprising:
a chatbot module which receives an image sent from a terminal apparatus to a chat system, and a message indicating that the image is to be edited;
a message determination module which extracts a key value from the message;
a database which registers a plurality of different key values, and a plurality of different parameter sets of different editing items corresponding to each of the key; and
an image editing module which
reads, from the database, a plurality of different parameter sets corresponding to the key value extracted from the message, and
edits the image for the different editing items by using each of the plurality of different parameter sets, thereby generating a plurality of different edited images of the image with respect to the key value extracted from the message, wherein
the chatbot module
sends the plurality of different edited images, to the chat system by a single post so that the terminal apparatus selects, on the chat system, one of the plurality of different edited images as an edited image of the image,
determines the edited image selected on the chat system by the terminal apparatus, and
outputs the edited image that has been selected, when the chatbot module receives a post indicating that the edited image is to be output, the post being sent from the terminal apparatus to the chat system.

2. The information processing apparatus according to claim 1, wherein the message determination module
performs morphological analysis on the message, and
extracts an adjective or an adjectival noun obtained by the morphological analysis as the key value.

3. The information processing apparatus according to claim 2, wherein when the message determination module detects a plurality of adjectives and/or adjectival nouns, the message determination module extracts a phrase including all of the plurality of adjectives and/or adjectival nouns as the key value.

4. The information processing apparatus according to claim 2, wherein:
the message determination module extracts, when a plurality of adjectives and/or adjectival nouns are detected, the plurality of adjectives and/or adjectival nouns as a plurality of key values, respectively; and
the image editing module
reads, from the database, at least a part of a plurality of different parameter sets corresponding to each of the plurality of key values that have been extracted, and
edits the image in accordance with each of the at least a part of the plurality of different parameter sets, thereby generating a plurality of different edited images.

5. The information processing apparatus according to claim 1, wherein the database registers parameter sets comprising:
a plurality of different parameter sets corresponding to a first key value;
a plurality of different parameter sets corresponding to a second key value different from the first key value; and
a plurality of different parameter sets corresponding to a third key value including the first key value and the second key value, and
the plurality of different parameter sets registered in the database are different from one another.

6. The information processing apparatus according to claim 1, wherein each of the parameter sets is a combination of parameters for a plurality of edit items.

7. An information processing method comprising:
receiving an image sent from a terminal apparatus to a chat system, and a message indicating that the image is to be edited;
extracting a key value from the message;
reading, from a database which registers a plurality of different key values, and a plurality of different parameter sets of different editing items corresponding to each of the key values, a plurality of different parameter sets corresponding to the key value extracted from the message;
editing the image for the different editing items by using each of the plurality of different parameter sets, thereby generating a plurality of different edited images of the image with respect to the key value extracted from the message;
sending the plurality of different edited images to the chat system by a single post so that the terminal apparatus selects, on the chat system, one of the plurality of different edited images as an edited image of the image;
determining the edited image selected on the chat system by the terminal apparatus; and outputting the edited image that has been selected, when a post, which indicates that the edited image is to be output and which is sent from the terminal apparatus to the chat system, is received.

8. A computer-readable non-transitory recording medium having stored thereon an information processing program, the information processing program causing a processor of an information processing apparatus to operate as:
- a chatbot module which receives an image sent from a terminal apparatus to a chat system, and a message indicating that the image is to be edited;
- a message determination module which extracts a key value from the message;
- a database which registers a plurality of different key values, and a plurality of different parameter sets of different editing items corresponding to each of the key values; and
- an image editing module which
  - reads, from the database, a plurality of different parameter sets corresponding to the key value extracted from the message, and
  - edits the image for the different editing items by using each of the plurality of different parameter sets, thereby generating a plurality of different edited images of the image with respect to the key value extracted from the message, wherein the chatbot module
- sends the plurality of different edited images to the chat system by a single post so that the terminal apparatus selects, on the chat system, one of the plurality of different edited images as an edited image of the image,
- determines the edited image selected on the chat system by the terminal apparatus, and
- outputs the edited image that has been selected, when the chatbot module receives a post indicating that the edited image is to be output, the post being sent from the terminal apparatus to the chat system.

* * * * *